(12) United States Patent
Reid et al.

(10) Patent No.: US 8,077,035 B2
(45) Date of Patent: Dec. 13, 2011

(54) AUTOMATIC TIMING ADJUSTMENT SYSTEM FOR OCCUPANCY SENSORS

(75) Inventors: Drew A. Reid, Brentwood, TN (US); William Stottlemyer, Mount Juliet, TN (US); James Murley, Jr., Nashville, TN (US); Charles Reneau, Nashville, TN (US); Robert Moore, Goodlettsville, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 487 days.

(21) Appl. No.: 12/259,373

(22) Filed: Oct. 28, 2008

(65) Prior Publication Data

US 2010/0102760 A1    Apr. 29, 2010

(51) Int. Cl.
    *G08B 13/00*    (2006.01)
(52) U.S. Cl. .......... 340/565; 315/308; 315/360
(58) Field of Classification Search .......... 315/307–308, 315/360
    See application file for complete search history.

(56) References Cited

U.S. PATENT DOCUMENTS

| 5,640,143 | A | | 6/1997 | Myron et al. |
| 5,699,243 | A | | 12/1997 | Eckel et al. |
| 5,946,209 | A | | 8/1999 | Eckel et al. |
| 5,986,357 | A | | 11/1999 | Myron et al. |
| 6,151,529 | A | * | 11/2000 | Batko .............. 700/28 |
| 6,415,205 | B1 | | 7/2002 | Myron et al. |
| 6,759,954 | B1 | | 7/2004 | Myron et al. |
| 2006/0125624 | A1 | | 6/2006 | Ostrovsky et al. .......... 340/527 |

FOREIGN PATENT DOCUMENTS

| DE | CH 683473 | 3/1994 |
| EP | 1311142 | 5/2003 |

OTHER PUBLICATIONS

PCT International Search Report for International Application No. PCT/US/2009/062336 dated Jan. 20, 2010 (4 pages).
PCT International Written Opinion for International Application No. PCT/US/2009/062336 dated Jan. 20, 2010 (7 pages).

* cited by examiner

*Primary Examiner* — Shawki S Ismail
*Assistant Examiner* — Jany Tran

(57) ABSTRACT

A lighting control system for a space equipped with lamps for illuminating the space comprises a power circuit for supplying power to the lamps, a controllable switch in the power circuit for turning the lamps on and off, an occupancy sensor for detecting motion within the space and generating a motion-detected control signal in response to the detection of such motion, and a timer for measuring a time-out interval following the generation of the motion-detected control signal by the occupancy sensor and producing a time-out control signal in response to completion of the measurement of the time-out interval. A processor receives the control signals from the occupancy sensor and the timer and produces a switch-off control signal for the controllable switch to turn the lamps off in response to the time-out control signal, modifies the time-out interval by a time-out offset value in response to preselected events, counts the number of times the switch-off control signal is produced, without the receipt of the motion-detected control signal, within a predetermined time following the end of the time-out interval, and decrements the time-out interval by the offset value in response to the count reaching a predetermined value.

20 Claims, 4 Drawing Sheets

AUTOMATIC TIMING ADJUSTMENT SYSTEM FOR OCCUPANCY SENSORS

FIELD OF THE INVENTION

The present invention relates generally to the use of occupancy sensors for controlling electrical systems and, more particularly, to an improved automatic timing adjustment system for occupancy sensors.

BACKGROUND OF THE INVENTION

Automatic shut-off lighting controls are used to save electrical energy, and are often required by legislated energy codes. Occupancy sensors are intended to keep lights ON while people are within the detection area. Detection is based on movement, which is typically sensed using passive infrared (PIR) or ultrasonic doppler shift means. When the occupant is stationary or does not move to a great enough degree to trigger detection, then the lights will turn OFF. To avoid this undesired consequence, a timer is employed to delay the OFF event. Ideally, this timer is set to a time that is at least the time between occupant movements such that the occupant will move again before the lights turn OFF. Determining the ideal duration of the timer can be a difficult chore. Occupant movements may be repetitive, but the interval between movements varies. If the timer duration is too short, then it is likely that the lights will turn OFF on the occupant. If the timer duration is too long, then the lights will remain ON longer than necessary after the occupant leaves the room, wasting energy. A false OFF can be a safety problem as well as an annoyance, so a longer than necessary time duration usually takes precedence over the need for energy savings. Occupancy sensors with manual timer settings may need to be re-adjusted until the occupant is satisfied. Sensors that have been in service for a while are often found with the time setting increased to the maximum or disabled altogether.

Manufacturers of occupancy sensors have attempted to address this problem by incorporating an automatic means to adjust the timer duration. One technique measures the interval between movements and tries to determine an ideal time-out setting based on a statistical interpretation of movement history. A reactive method increases the time-out setting in response to a false OFF event. A false OFF is assumed if movement occurs immediately after the OFF event.

There are problems with these existing methods. A statistical approach requires a great deal of data before it can zero in on the best setting, making it inherently slow to adjust in new occupancies or when the type of occupancy changes. The frustration and annoyance of occupants can be high due to false OFF occurrences while the sensor "learns the room." Stories of adaptive timing schemes being manually disabled are legend. In contrast, the reactive approach offers faster adaptation by increasing the timer in response to a single false OFF event. However, the drawback to this approach is that the timer duration will never be reduced when the type of occupancy changes. It is also more likely that all reactive sensors will eventually arrive at the maximum timer setting, wasting energy. Currently available reactive sensors typically make large adjustments in the timer (e.g., 1.5 times the existing value) so that the sensor reaches the maximum time-out very quickly to reduce annoyance to the occupants, but at is the expense of energy savings.

Manufacturers also are concerned with false ON events since such occurrences waste energy. One proposal to reduce false ON events is to use a fault tolerant mode that requires two subsequent initial detection movements before the sensor turns ON. This method is not ideal since it introduces a time lag. For example, with the PIR detection method, the occupant must move through two optical segments before the lights turn ON. This may require further travel into a dark room, compromising safety.

SUMMARY OF THE INVENTION

In accordance with one embodiment, a lighting control system for a space equipped with lamps for illuminating the space comprises a power circuit for supplying power to the lamps, a controllable switch in the power circuit for turning the lamps on and off, an occupancy sensor for detecting motion within the space and generating a motion-detected control signal in response to the detection of such motion, and a timer for measuring a time-out interval following the generation of the motion-detected control signal by the occupancy sensor and producing a time-out control signal in response to completion of the measurement of the time-out interval. A processor receives the control signals from the occupancy sensor and the timer and produces a switch-off control signal for the controllable switch to turn the lamps off in response to the time-out control signal, modifies the time-out interval by a time-out offset value in response to preselected events, counts the number of times the switch-off control signal is produced without the receipt of the motion-detected control signal within a predetermined time following the end of the time-out interval, and decrements the time-out interval by the offset value in response to the count reaching a predetermined value.

In one implementation, the processor also increments time-out interval by the offset value in response to the receipt of the motion-detected control signal within a predetermined time following the end of the time-out interval.

In another embodiment, a lighting control system for a space equipped with lamps for illuminating the space, comprises a power circuit for supplying power to the lamps, a controllable switch in the power circuit for turning the lamps on and off, an occupancy sensor for detecting motion within the space and generating a motion-detected control signal in response to the detection of such motion, a timer for measuring a time-out interval following the generation of the motion-detected control signal by the occupancy sensor and producing a time-out control signal in response to completion of the measurement of the time-out interval, and an input device for manually selecting a minimum value for the time-out interval. A processor receives the control signals from the occupancy sensor and the timer and produces a switch-off control signal for the controllable switch to turn the lamps off in response to the time-out control signal, modifies the time-out interval by a time-out offset value in response to preselected events, and limits modification of the time-out interval to the manually selected minimum value.

In one implementation, the processor also increments the time-out interval by an offset value in response to the receipt of the motion-detected control signal within a predetermined time following the end of the time-out interval, counts the number of times the switch-off control signal is produced without the receipt of the motion-detected control signal within a predetermined time following the end of the time-out interval, and decrements the time-out interval in response to the count reaching a predetermined value. The processor may store the time-out interval as modified by the algebraic sum of the increments and decrements.

In another implementation, the timer is set to an initial value for the time-out interval, and the processor is programmed to reset the time-out interval in response to a change in the initial value of the time-out interval, and to limit the time-out interval to values below a predetermined maximum value.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
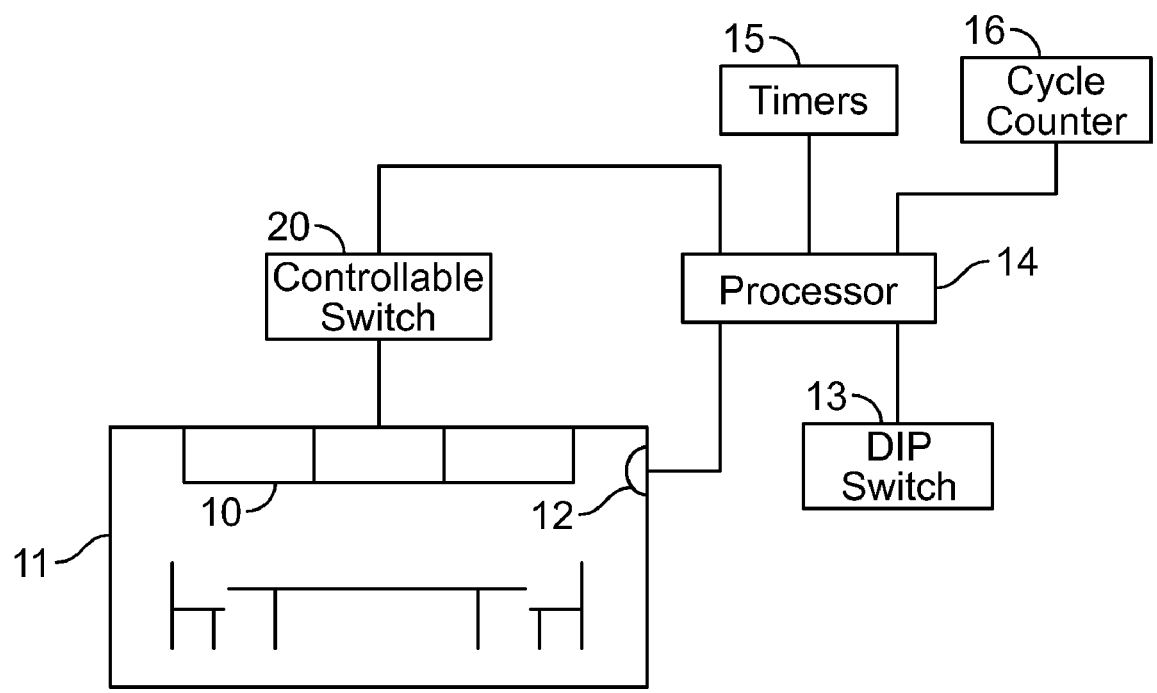
FIG. 1 is a diagram of a lighting control system for controlling the artificial illumination of a space containing an occupancy sensor.

Turning now to the drawings, FIG. 1 is a diagram of a lighting control system for controlling the status of lamps 10 that artificially illuminate a space 11, such as a conference room, that contains an occupancy sensor 12. The control system includes a DIP switch 13 to permit the manual setting of a time-out period, and a processor (microcontroller) 14 connected to both the occupancy sensor 12 and the DIP switch 13. The processor 14 uses input signals, along with information that it stores regarding the operating history of the control system, to produce output signals that control the supply of power to the lamps 10. The processor 14 executes an algorithm that determines when the lamps 10 should be energized or de-energized.

Specifically, the processor 14 receives input signals from the occupancy sensor 12, such as a conventional passive infrared ("PIR") sensor that detects infrared emissions from occupants in the monitored space. The output signal from the occupancy sensor 12 is passed through conventional filters to remove spurious signals that do not represent movement of occupants. The processor also communicates with timers 15 and a cycle counter 16, as discussed in detail below.

The processor 14 produces a control signal for a controllable switch 20 such as a relay driver that controls the energization and de-energization of a coil of a latching relay. The coil controls the opening and closing of relay contacts, which in turn control the energization and de-energization of a power circuit providing power to the lamps 10. Specifically, closing the relay contacts supplies power to the lamps 10 by closing a circuit that includes a conventional power source and the lamps 10.

As will be described in detail below, the processor 14 can supply control signals to the controllable switch 20 in response to the execution of an algorithm that utilizes stored information related to the history of energization and de-energization of the lamps 10. Alternatively, the control signals can be produced in response to the operation of a manual pushbutton-operated (momentary) switch that acts as a toggle switch. Thus, if the lamps 10 are OFF, pressing the pushbutton causes the processor 14 to send the controllable switch 20 a control signal that causes the driver to turn ON the lamps 10. Pressing the pushbutton again turns OFF the lamps 10.

The processor 14 also receives inputs from the manually settable DIP switch 13, which in one example has three switches SW1-SW3 that can be individually set ON or OFF. The settings of the three switches SW1-SW3 select the initial value of a time-out interval, as follows:

| Time Delay (Minutes) | SW3 | SW2 | SW1 |
|---|---|---|---|
| (Unused) | OFF | OFF | OFF |
| 2 | OFF | OFF | ON |
| 5 | OFF | ON | OFF |
| 10 | OFF | ON | ON |
| 15 | ON | OFF | OFF |
| 20 | ON | OFF | ON |
| 25 | ON | ON | OFF |
| 30 | ON | ON | ON |

Preferably, the initially selected time-out interval and the minimum time-out interval are the same, although the values could be different. For example, the minimum time-out interval could be calculated as some percentage of the initially selected time-out interval.

When motion is detected by the occupancy sensor 12, the processor 14 sends a control signal to the controllable switch 20 to turn ON the lamps 10. At the same time, the processor 14 starts one of the timers 15, a "time-out" timer, to measure the time-out interval, and repetitively re-starts the timer if motion is detected during that interval. This prevents the lamps 10 from being turned OFF as long as occupants are present in the monitored space. Thus, the time-out interval is the time for which the lamps illuminating the monitored space remain ON following the detection of motion within that space.

Figure 2A:
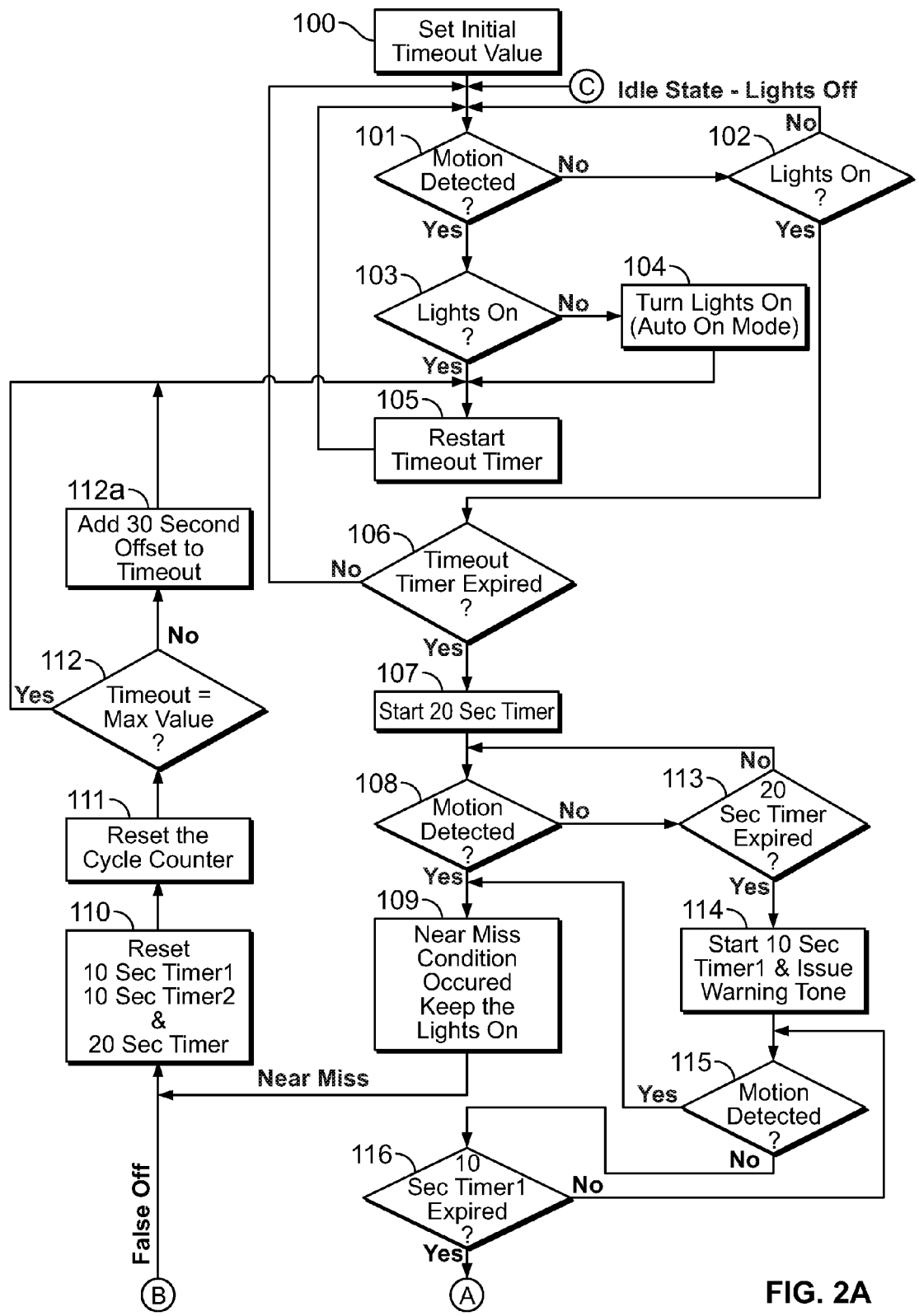
FIGS. 2A and 2B form a single flow chart of one embodiment of a routine executed by the processor in the system of FIG. 1, for adaptively tuning a time-out interval to automatically adapt the control system to the actual intervals occurring between detectable motions in the monitored space.
Figure 2B:
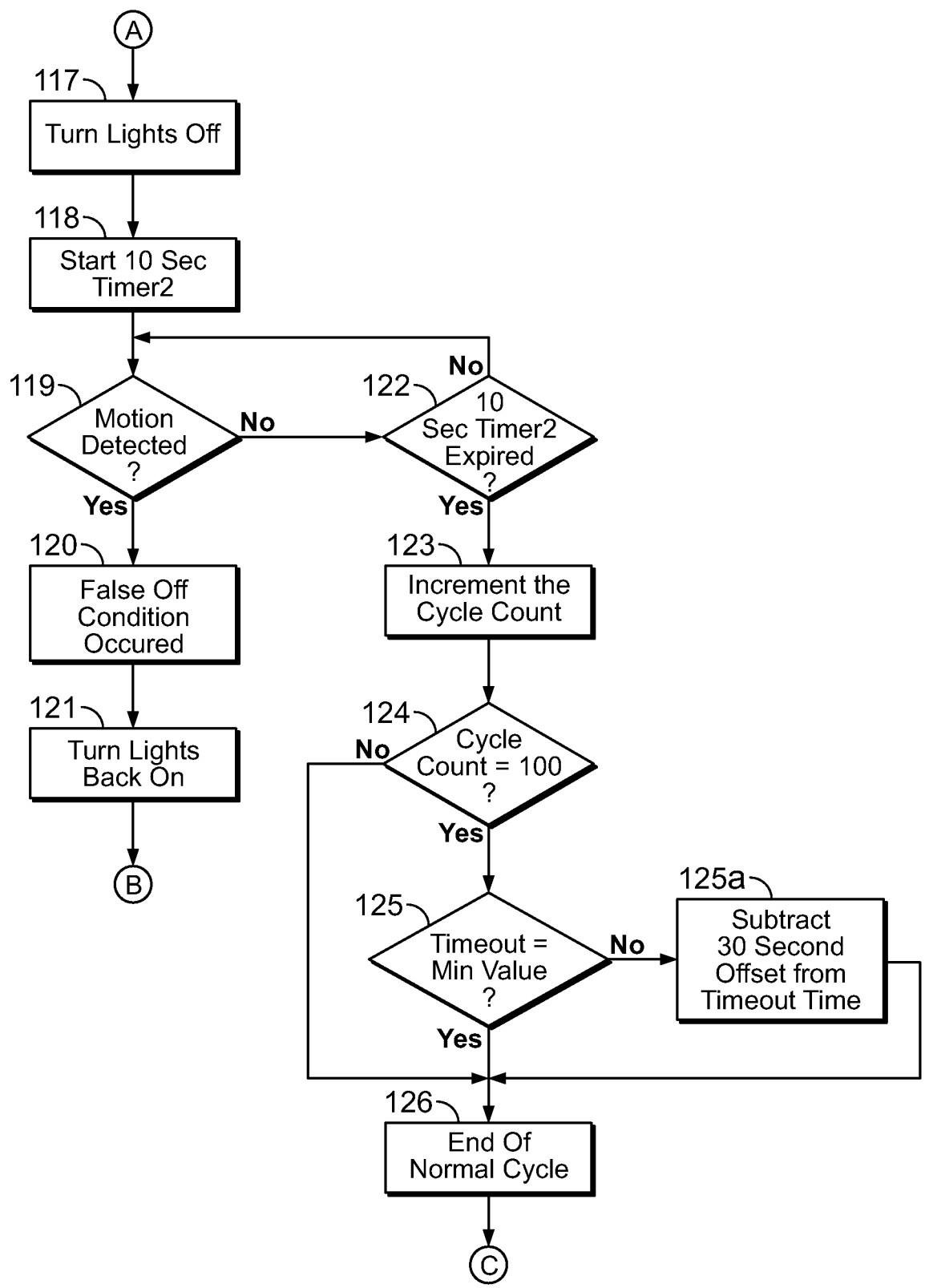

FIGS. 2A and 2B form a flow chart of an algorithm that can be executed by the processor 14 in the system of FIG. 1. The first step 100 sets the initial time-out interval, determined by the setting of the switches SW1-SW3 in the DIP switch 13. In this example, the initial time-out value is also used as a minimum time-out interval. Alternatively, a different timeout value may be selected by a second DIP switch (not shown). The time-out value is not allowed to drop below the minimum value, even though the time-out value can be adjusted within a range extending from the selected minimum value to a preselected maximum value, as described in more detail below.

Step 101 determines whether motion has been detected by the occupancy sensor 12. If the answer is negative, the system proceeds to step 102 to determine whether the lamps 10 are ON. If the answer is negative at step 102 (i.e., the lamps 10 are OFF), the system returns to step 101 to await the detection of motion in the monitored space. If the answer at step 101 is affirmative (i.e., motion has been detected), the system advances to step 103 to determine whether the lamps 10 are ON. If the answer is negative at step 103, the lamps are turned ON at step 104, the time-out timer 30 is re-started at step 105 to start measuring another time-out interval, and the system then returns to step 101. If the answer is affirmative at step 103, indicating that the lamps are still ON, the system restarts the timer at step 105 and returns to step 101.

When step 102 determines that the lamps 10 are ON, when no motion was detected at step 101, the system advances to step 106 to determine whether the time-out timer 30 has expired, i.e., whether the time-out value has been reached since the last motion detection. If the answer at step 106 is negative, the system returns to step 101 to await the detection of motion. When step 106 yields an affirmative answer, indicating that the elapsed time since the last detected motion has exceeded the time-out interval, the system advances to step 107 to start a 20-second timer to measure the first 20 seconds of a 30-second "near-miss" interval. Step 108 then determines whether motion has been detected after the 20-second timer has been started, and an affirmative answer is detected as a "near-miss" condition at step 109 and the lamps are kept ON.

From step 109, the system then advances to step 110 to reset all three timers (the 20-second timer and both 10-second timers), and then to step 111 to reset the cycle counter, further explained below. Step 112 then determines whether the time-out interval has reached its maximum value. If the answer is affirmative, the system returns to step 105 to re-start the time-out timer before returning to step 101. If the answer is negative at step 112, then step 112a increments the time-out interval by an offset value of 30 seconds (or other preselected amount), and then the system proceeds to step 105 to re-start the time-out timer. The offset of the time-out interval is zero until the first "incrementing" operation at step 112a.

If no motion is detected at step 108, step 113 determines whether the 20-second timer has expired, and a negative answer returns the system to step 108. If step 113 determines that the 20-second timer has expired, indicating that a "near-miss" condition did not occur during that 20-second interval, step 114 generates a 10-second warning (e.g., generating audible tones or blinking lights) and starts a first 10-second timer to measure the last 10 seconds of the 30-second "near-miss" interval. Step 115 then determines whether motion has been detected after the first 10-second timer has been started, and an affirmative answer is detected as a "near-miss" condition at step 109 and the lamps are kept ON. If no motion is detected at step 115, step 116 determines whether the first 10-second timer has expired, and a negative answer returns the system to step 115.

Figure 3:
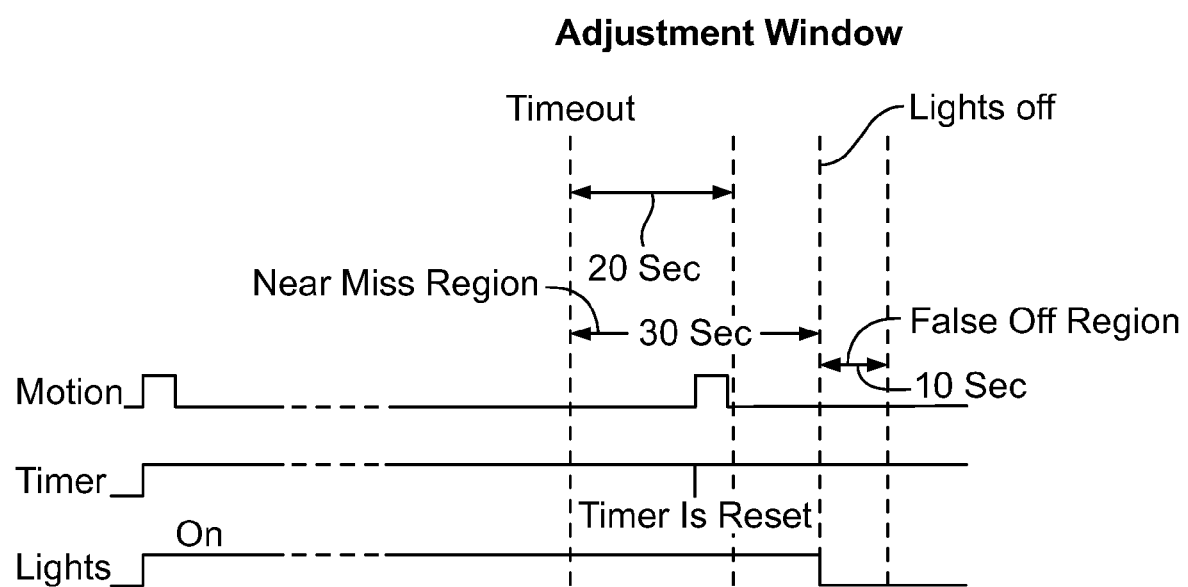
FIG. 3 is a timing diagram for the flow chart of FIGS. 2A and 2B.

As can be seen from the timing diagram in FIG. 3, a total "near-miss" interval of 30 seconds is provided by the combination of the 20-second interval and the first 10-second interval. If motion is detected at any time during the 30-second interval following the end of a time-out interval, step 109 determines that a "near-miss" condition has occurred and, therefore, that the lamps 10 should remain ON. That is, a "near-miss" condition is any detection of motion within the 30-second interval following the end of a time-out interval.

When step 116 determines that the first 10-second interval has expired (without the detection of any motion), the lamps 10 are turned OFF at step 117 (FIG. 2B). The system then advances to step 118 to start a second 10-second timer to measure a 10-second "false-off" interval, and then to step 119 to determine whether any motion is detected within the second 10-second interval. The occurrence of motion during this second 10-second interval following the end of the 30-second "near-miss" interval (see FIG. 3) is referred to as a "false-off" condition. If no motion is detected at step 119, i.e., during the "false-off" interval, step 122 determines whether the second 10-second timer has expired and, if the answer is negative, returns the system to step 119.

An affirmative answer at step 119 indicates that motion is detected during the second 10-second interval, which is detected as a "false-off" condition at step 120, causing the lamps to be turned back ON at step 121. The system then advances to step 110 (FIG. 2A) to reset all three timers, then to step 111 to reset the cycle counter, and then to steps 112 and 112a to increment the time-out interval by the offset value as described above.

Thus, whenever a "near-miss" condition or a "false-off" condition is detected, the system increments the time-out interval by the offset value at step 112a (provided the time-out interval has not reached its maximum value). This incremental increase in the time-out interval in response to the occurrence of either a "near-miss" condition or a "false-off" condition is part of the adaptive tuning of the time-out interval to automatically adapt the control system to the actual intervals occurring between detected motions in the monitored space.

When step 122 produces an affirmative answer, indicating that the second 10-second interval has expired without the occurrence of a "false-off" condition, step 123 increments the cycle counter 16 that keeps track of the number of times the lamps 10 are automatically turned OFF without the occurrence of either a "near-miss" condition or a "false-off" condition. Step 124 then determines whether the cycle counter has reached 100 cycles. If the answer is negative, the system advances to step 126, which is the end of a normal cycle, and then returns to step 101 to start another cycle.

An affirmative response at step 124 advances the system to step 125, which determines whether the time-out interval has reached its preselected minimum value. If the answer is affirmative, the system proceeds to step 126 to end the cycle. If the answer is negative at step 125, then step 125a decrements the time-out interval by the offset value by 30 seconds (or other preselected amount). This decrementing of the time-out interval in response to the occurrence of 100 cycles without the occurrence of either a "near-miss" condition or a "false-off" condition, is another part of the adaptive tuning of the time-out interval to automatically adapt the control system to the actual intervals occurring between detected motions in the monitored space. Of course, the offset of the time-out interval is zero until the first incrementing operation has occurred at step 112a, so no decrementing is possible until after the first incrementing operation has occurred, i.e., the offset cannot be a negative value.

The offset of the time-out interval at any given time is the algebraic sum of the increments effected at step 112a and the decrements effected at step 125a. This modified time-out interval is preferably stored in non-volatile memory, which is reset whenever the setting of the DIP switch 13 is changed. The time-out interval is also preferably limited to a predetermined maximum value. The time-out interval is never less than the DIP switch value, which represents the minimum time-out interval in this embodiment.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A lighting control system for a space equipped with lamps for illuminating the space, comprising
   a power circuit for supplying power to said lamps,
   a controllable switch in said power circuit for turning said lamps on and off,
   an occupancy sensor for detecting motion within said space and generating a motion-detected control signal in response to the detection of such motion,
   a timer for measuring a time-out interval following the generation of said motion-detected control signal by said occupancy sensor and producing a time-out control signal in response to completion of the measurement of said time-out interval, and a processor receiving said control signals from said occupancy sensor and said timer and programmed to produce a switch-off control signal for said controllable switch to turn said lamps off in response to said time-out control signal, modify said time-out interval by a time-out offset value in response to preselected events, count the number of times said switch-off control signal is produced without the receipt of said motion-detected control signal within a predetermined time following the end of said time-out interval, and decrement said time-out interval by said offset value in response to said count reaching a predetermined value.

2. The lighting control system of claim 1 in which said offset value is about 30 seconds.

3. The lighting control system of claim 1 in which said processor is programmed to increment said time-out interval by said offset value in response to the receipt of said motion-detected control signal within a predetermined time following the end of said time-out interval.

4. The lighting control system of claim 3 in which said offset value is about 30 seconds.

5. The lighting control system of claim 3 which includes an input device for manually selecting a minimum value for said time-out interval, and said processor is programmed to limit modification of said time-out interval to values above said manually selected minimum value.

6. The lighting control system of claim 3 in which said processor is programmed to store the time-out interval as modified by the algebraic sum of said increments and decrements.

7. The lighting control system of claim 3 in which said timer is set to an initial value for said time-out interval, and said processor is programmed to reset said time-out interval in response to a change in said initial value of said time-out interval, and to limit said time-out interval to values below a predetermined maximum value.

8. The lighting control system of claim 1 which includes an input device for manually selecting a minimum value for said time-out interval, and said processor is programmed to limit modification of said time-out interval to values above said manually selected minimum value.

9. The lighting control system of claim 1 in which said time-out interval has a preselected maximum value, and said processor is programmed to limit modification of said time-out interval to values below said preselected maximum value.

10. The lighting control system of claim 1 in which said time-out interval has a preselected initial value.

11. The lighting control system of claim 1 in which said processor is programmed to produce a switch-on control signal for said controllable switch to turn said lamps on in response to the receipt of said motion-detected control signal within a predetermined time following the end of said time-out interval.

12. A lighting control system for a space equipped with lamps for illuminating the space, comprising a power circuit for supplying power to said lamps, a controllable switch in said power circuit for turning said lamps on and off, an occupancy sensor for detecting motion within said space and generating a motion-detected control signal in response to the detection of such motion, a timer for measuring a time-out interval following the generation of said motion-detected control signal by said occupancy sensor and producing a time-out control signal in response to completion of the measurement of said time-out interval, an input device for manually selecting a minimum value for said time-out interval, and a processor receiving said control signals from said occupancy sensor and said timer and programmed to produce a switch-off control signal for said controllable switch to turn said lamps off in response to said time-out control signal, modify said time-out interval by a time-out offset value in response to preselected events occurring within a predetermined time period after said time-out control signal is produced by said timer, and limit modification of said time-out interval to values above said manually selected minimum value.

13. The lighting control system of claim 12 in which said time-out interval has a manually selectable initial value that is equal to said minimum value.

14. A method of controlling artificial illumination of a space equipped with electrically powered lamps for illuminating the space, a power circuit for supplying power to said lamps, a controllable switch in said power circuit for turning said lamps on and off, and an occupancy sensor for detecting motion within said space and generating a motion-detected control signal in response to the detection of such motion, said method comprising measuring a time-out interval following the generation of said motion-detected control signal by said occupancy sensor and producing a time-out control signal in response to completion of the measurement of said time-out interval, modifying said time-out interval by a time-out offset value in response to preselected events, counting the number of times said switch-off control signal is produced without the receipt of said motion-detected control signal within a predetermined time following the end of said time-out interval, and decrementing said time-out interval by said offset value in response to said count reaching a predetermined value.

15. The method of claim 14 which includes incrementing said time-out interval in response to the receipt of said motion-detected control signal within a predetermined time following the end of said time-out interval.

16. The method of claim 15 which includes manually selecting a minimum value for said time-out interval, and limiting modification of said time-out interval to values above said manually selected minimum value.

17. The method of claim 15 which includes storing the time-out interval as modified by the algebraic sum of said increments and decrements.

18. The method of claim 15 which includes setting said time-out interval to an initial value, resetting said time-out interval in response to a change in said initial value of said time-out interval, and limiting said time-out interval to values below a predetermined maximum value.

19. The method of claim 14 which includes producing a switch-on control signal for said controllable switch to turn said lamps on in response to the receipt of said motion-detected control signal within a predetermined time following the end of said time-out interval.

20. A method of controlling artificial illumination of a space equipped with electrically powered lamps for illuminating the space, a power circuit for supplying power to said lamps, a controllable switch in said power circuit for turning said lamps on and off, and an occupancy sensor for detecting motion within said space and generating a motion-detected control signal in response to the detection of such motion, said method comprising:

measuring a time-out interval following the generation of said motion-detected control signal by said occupancy sensor and producing a time-out control signal in response to completion of the measurement of said time-out interval, manually selecting a minimum value for said time-out interval, producing a switch-off control signal for said controllable switch to turn said lamps off in response to said time-out control signal, modifying said time-out interval by a time-out offset value in response to preselected events occurring within a predetermined time period after said time-out control signal is produced, and limiting modification of said time-out interval to values above said manually selected minimum value.

* * * * *